United States Patent [19]

Scola et al.

[11] Patent Number: 4,631,335
[45] Date of Patent: Dec. 23, 1986

[54] POLYIMIDE OF ALKYLENE DIAMINE AND 4,4'(HEXAFLUOROISOPROPYLIDENE)BIS-(O-PHTHALIC ANHYDRIDE)

[75] Inventors: Daniel A. Scola, Glastonbury, Conn.; Ruth H. Pater, Rocky River, Ohio

[73] Assignee: United Technologies Corporation, Hartford, Conn.

[21] Appl. No.: 685,937

[22] Filed: Dec. 24, 1984

[51] Int. Cl.$^4$ .............................................. C08G 73/10
[52] U.S. Cl. ................. 528/353; 428/411.1; 524/600
[58] Field of Search ......................... 528/353; 524/600

[56] References Cited

U.S. PATENT DOCUMENTS

| | | | |
|---|---|---|---|
| 3,310,573 | 3/1967 | Coe | 260/346.3 |
| 3,356,648 | 12/1967 | Rogers | 528/353 |
| 4,063,984 | 12/1977 | Critchley | 528/353 |
| 4,361,175 | 6/1982 | Gibbs | 528/353 |

FOREIGN PATENT DOCUMENTS

| | | |
|---|---|---|
| 1062435 | 3/1967 | United Kingdom . |
| 1216505 | 12/1970 | United Kingdom ................ 528/353 |

*Primary Examiner*—Lester L. Lee
*Attorney, Agent, or Firm*—A. Dean Olson

[57] ABSTRACT

A low temperature processable moisture resistant polyimide and fiber reinforced composite of such a polymer and methods for making the same. The polyimide resin has repeating polymer units of the formula

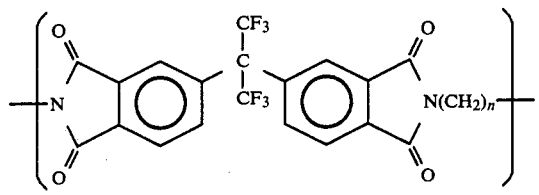

wherein n is 2 to about 20 and the molecular weight of the polymer chain is such that the polymer absorbs below about 0.2% by weight moisture at room temperature. The polyimide is made by reacting 4,4'(hexafluoroisopropylidene)bis(o-phthalic anhydride) with a diamine having the formula $H_2N(CH_2)_nNH_2$ wherein n is 2 to about 20 to form a polyamic acid. The polyamic acid is imidized to form the polyimide prepolymer and then further polymerized by exposing the polyimide prepolymer to heat to form the polymer described above. The composite can be made using the above process by coating fibers with the polyimide prepolymer, stacking layers of the coated fibers in a mold, and hot pressing the stacked impregnated fibers. The composite can also be made by coating fibers with 4,4'(hexafluoroisopropylidene)bis(o-phthalic anhydride) and a diamine as described above stacking layers of the coated fibers in a mold and hot pressing the stacked impregnated fibers.

5 Claims, No Drawings

POLYIMIDE OF ALKYLENE DIAMINE AND 4,4'(HEXAFLUOROISOPROPYLIDENE)BIS(O-PHTHALIC ANHYDRIDE)

CROSS-REFERENCE TO RELATED APPLICATIONS

Attention is directed to commonly assigned copending application, Polyimides and Methods for Making and Using the Same, D. Scola and R. Pater, Ser. No. 685,936, filed on even date herewith, which discloses material similar to that used in the present application, the disclosure of which is incorporated by reference.

DESCRIPTION

1. Technical Field

The field of art to which this discovery relates is polyimides, polyimide composites and methods of making the same.

2. Background Art

The need for lightweight components for use in aerospace technologies has stimulated the development of polymeric materials. Materials used in these environments should exhibit a variety of physical properties including processing ease, strength, toughness, moisture resistance and solvent resistance. Although polymers exist that exhibit one or more of the above physical properties, these materials are generally deficient in at least one other desired property.

For instance, the epoxy polymer system has generally been the matrix material of choice for forming fiber reinforced composites however, it can for example swell upon exposure to moisture. Composite materials containing conventional polyesters, polysulfones, and polyimides are also deficient in one or more desired physical properties such as solvent resistance.

Accordingly, there is a continual search in the art for synthetic polymeric materials exhibiting improved physical properties, especially for aerospace applications.

DISCLOSURE OF INVENTION

This disclosure is directed to a polyimide resin having repeating polymer units of the formula

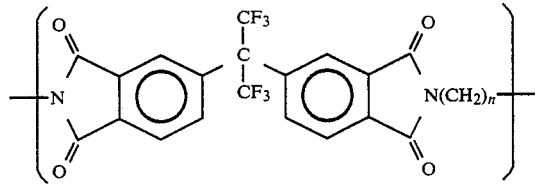

wherein n is 2 to about 20 and the molecular weight of the polymer chain is such that the polymer absorbs below about 0.2 percent (%) by weight moisture at room temperature.

Another aspect of this invention is a method of making such a polyimide by reacting 4,4'-(hexafluoroisopropylidene)bis(o-phthalic anhydride) with a diamine having the formula $H_2N(CH_2)_nNH_2$ where n is 2 to about 20. These compounds react to form the intermediate polyamic acid. Next, the polyamic acid is imidized to form the polyimide prepolymer. The polyimide prepolymer is further polymerized by exposing the polyimide prepolymer to heat resulting in said polyimide which absorbs less than about 0.2% by weight moisture at room temperature.

Another aspect of this disclosure is a method of making a fiber reinforced polyimide composite. Fibers are impregnated with a low temperature processable, polyimide prepolymer having such a repeating polymer unit as described above and a molecular weight of about 5,000 to about 50,000. Layers of the polyimide prepolymer impregnated fibers are stacked in a mold and hot pressed below about 200° C. resulting in a composite that absorbs below about 0.2% by weight moisture at room temperature.

Yet another aspect of this disclosure is another method of making such a fiber reinforced polyimide composite. Fibers are impregnated with 4,4'-(hexafluoroisopropylidene)bis(o-phthalic anhydride) and a diamine compound having the formula $H_2N(CH_2)_nNH_2$ where n is 2 to about 20. The impregnated fibers are stacked in layers in a mold and hot pressed resulting in a composite that absorbs below about 0.2% by weight moisture at room temperature.

This discovery provides a polyimide material with significantly improved physical properties for use in aerospace applications. For example, by utilizing this polyimide that contains the hexafluoroisopropylidene moiety, a composite can be made with vastly improved moisture resistance.

Best Mode for Carrying Out the Invention

The polyimide of this disclosure hereinafter referred to as poly 6F diimide has repeating units of the formula

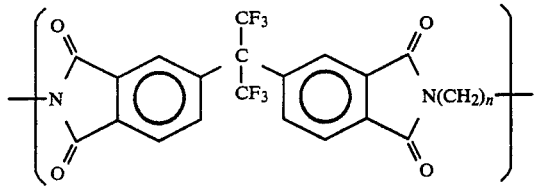

wherein n is 2 to about 20. It is preferred that n is about 10 to about 14 and especially preferred that n is 12. The molecular weight of the polymer chain is such that the polymer absorbs below about 0.2% by weight moisture at room temperature. Percent by weight moisture refers to moisture absorbed (gms) divided by initial dry resin weight multiplied by one hundred. At this molecular weight the polyimide has a glass transition temperature (Tg) of about 150° C. It is difficult to determine a molecular weight number as the polyimide is not soluble in many conventional solvents used in molecular weight determination procedures, such as an intrinsic viscosity measurement. It is believed that the molecular weight is greater than 50,000 as that is typically the minimum necessary to achieve minimum moisture absorption of about 0.1 to 0.57% by weight. It is also believed that the molecular weight is less than 200,000 as molecular weights above 200,000 are difficult to achieve. Also, depending on the solvents, initiators, and inhibitors used in making the polyimide the polymer chains may have various functional end groups such as a solvent molecule. It is also believed that the polymer exhibits liquid crystal orientation. Liquid crystals are crystals in which the polymer units are arranged in parallel arrays to form an ordered pattern of molecules which exhibit crystalline-like properties, e.g. high strength, and stiffness. The poly 6F diimide can be synthesized from 4,4'-(hexafluoroisopropylidene) bis(o-phthalic anhydride) and alkane diamines.

4,4'-(hexafluoroisopropylidene)bis(o-phthalic anhydride) hereinafter referred to as 6F dianhydride has been available commercially and can also be made as set forth in U.S. Pat. No. 3,310,593 and Belgium Pat. No. 649,366, the disclosures of which are incorporated by reference. Briefly, the anhydride can be synthesized by a multi-step process. Orthoxylene available from Aldrich Chemical Company and hexafluoracetone sesquihydrate available from I.C.N. Pharmaceuticals, Inc. react in the presence of the Friedel-Crafts catalyst, hydrogen fluoride, available from Matheson Gas Products Inc. to form 4,4'-(hexafluoroisopropylidene)bis(o-xylene). Upon isolation this compound can be oxidized with nitric acid or potassium permanganate to form the corresponding tetra acid. The tetra acid can be dehydrated to form the corresponding dianhydride 4,4'-(hexafluoroisopropylidene)bis(o-phthalic anhydride) which is referred to as 6F dianydride.

The alkane diamines utilized have the formula $NH_2(CH_2)_nNH_2$ where n is 2 to about 20 and are commercially available from Aldrich Chemical Company under the names α, ω-diamino-alkanes. It is preferred that n is about 10 to about 14 and especially preferred that n is 12 because it is believed that adhesion and the Tg both decrease as the alkyl content of the polymer unit increases. The inclusion of one or more aliphatic or unsaturated aliphatic diamines other than disclosed, e.g. 1, 2, diamino propane, 1, 2 diamino 2-methylpropane to the extent that they do not detract substantially from the desirable results obtained with the stated reactants are contemplated in the formation of these prepolymers and polymers.

Polyamic acid can be synthesized by mixing a solution of the 6F dianhydride with a solution of the diamine having the formula $NH_2(CH_2)_nNH_2$ where n is about 2 to about 20 to produce the polyamic acid intermediate by an amidization process. Empirically this can be illustrated as:

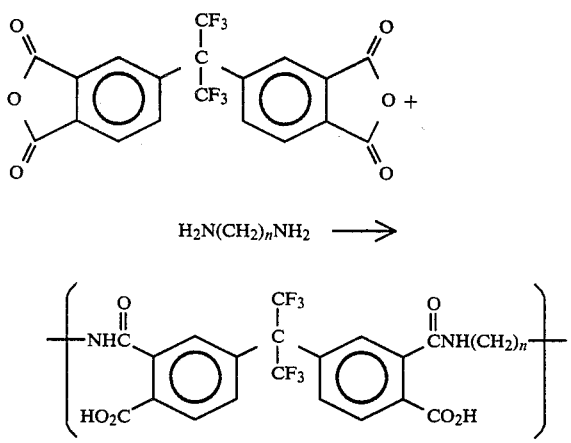

The polyamic acid can be imidized to form the polyimide prepolymer (a low molecular weight 5,000–50,000 form) which can be heated preferably under pressure to increase the molecular weight forming the polyimide of this disclosure. Imidization refers to the cyclic condensation (dehydration) of the amide and acid group to an imide by for example the addition of heat. Empirically this can be illustrated as:

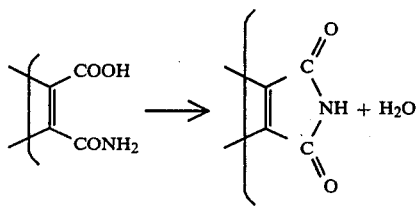

Thus 6F dianhydride is dissolved in a 1 part chloroform to 3 parts acetone solution. The diamine is dissolved in a chloroform solution. Other suitable solvent(s) may be substituted in varying proportions for the above solvents. The two solutions are then mixed together, preferably by adding the 6F dianhydride solution over about 25 to 35 miniutes to the diamine solution at temperatures conventional in the art such as room temperature. Upon mixing, the monomers amidize to form polyamic acids of particular molecular weights.

It will be known to those skilled in the art to vary the process parameters to obtain polymer chains of the desired molecular weight. These process parameters include addition time, temperature, pressure, solvents, monomer proportions, concentrations, initiators, inhibitors, etc. For instance if the two monomers are combined in 6F dianhydride to diamine molar proportions of 1.0 to 1.05, a higher molecular weight occurs than if they are combined in 1 to 1 molar ratios. Conversely 6F dianhydride to diamine molar proportions of 1.20 to 1.0 result in polymers of lower molecular weights than 1 to 1 ratios. Depending on the choice of specific parameters the process specifications may have to be adjusted but these changes are conventional in the art.

The polyamic acid intermediate as formed in the chloroform acetone solution precipitates out as a white solid which can be filtered and air dried. This amic acid intermediate is dissolved in a suitable solvent such as β-methoxyethanol (Cellosolve TM Union Carbide Corporation) and refluxed for about two hours. The poly 6F diimide product can be isolated by, for example, aqueous precipitation followed by filtration and drying. The resultant polyimide prepolymer has a molecular weight of about 5,000 to 50,000. This polyimide prepolymer is further polymerized typically by molding at temperatures of about 150° C. to about 200° C., preferably about 180°, for about 30 to 120 minutes, preferably at pressures of about 25 to about 200 pounds per square inch (psi) to yield the polyimide described above.

EXAMPLE 1

A solution of 6F dianhydride (113.6 grams (g), 0.25 mole) in chloroform-acetone 250 milliliters (ml)/750 ml was added dropwise to a solution of 1,12 diamino dodecane (47.5 g, 0.238 mole) in chloroform (200 ml) at room temperature over a period of one-half hour. The polyamic acid intermediate which precipitated out, was filtered and air dried yielded a white solid 159 g. The polyamic acid intermediate was dissolved in 200 ml cellosolve and heated to reflux for two hours. After cooling, water was added to precipitate the prepolymer. An orange-brown solid, poly(N,N'-dodecamethylene)-4-(hexafluoroisopropylidene diphthalimide) hereinafter referred to as 6F-1,12-DDA, was filtered from the solution and dried resulting in about 155 g (97–99% yield). Polymer samples were prepared from the prepolymer powder by compression molding at 200 psi, 160° C. for 60 minutes. This resulted in solid, tough, brown-red samples of the above-identified polymer in its high molecular weight form.

Any fiber or fiber-like material, e.g. whiskers, typically used in composites is suitable for incorporation in polyimide matrices. Preferably the fiber should have tensile properties of at least the following, a tensile strength of 400,000 psi, a tensile modulus of $40 \times 10^6$ psi and a strain to failure of 1.5%. It is especially preferred that the fiber is graphite, silicon nitride, silicon carbide, boron, carbon, or even polyimide. One example is Celion 6000 TM (Celanese Chemical Co.), a graphite yarn with a ratio of six thousand fibers per tow. Typically, the fibers range from about 0.18 millimeters (mm) to about 0.20 mm in diameter. The fiber's properties will effect the properties of the composite and so fiber selection should be made with that consideration in mind. Typically, the fibers comprise from about 40% to about 60% by volume of the composite.

A variety of methods may be used to produce composite articles containing poly 6F diimide polymer. One method is a continuation of the prepolymer preparation procedure described above. This method allows greater control of composite properties. The reinforcing graphite fibers (tows) are dipped into the poly 6F diimide prepolymer β-methoxyethanol solution subsequent to the reflux to form a tape prior to the compression molding step. Then the tape containing the resin impregnated graphite fibers are dried so that the solvent will evaporate. This may be done at room temperature or for instance at 100° C. under vacuum conditions. However, drying temperatures should not exceed 120° C. The graphite tape can then be cut into plies (layers of impregnated fibers) of the desired dimensions of the article to be fabricated. The plies are then stacked to create the desired thickness in metal molds coated with mold release agent such as Micro Spray TM (Micro-Spray Products, Inc.). The assembled ply layup is then placed in a preheated press and pressures of about 100 psi to about 200 psi were applied at temperatures of about 150° C. to about 200° C. for about 60 to about 120 minutes.

Another method of making these fiber reinforced polyimide composites is inpregnating the fibers with the dianhydride and diamines described above, stacking the fibers in a mold and hot pressing the fiber layup. This method eliminates the step where the poly 6F diimide prepolymer is made prior to coating the fibers thus reducing polymer handling problems. Typically, 6F dianhydride is dissolved with heat in a suitable solvent such as methanol or Cellosolve and a diamine is dissolved with heat to form another Cellosolve solution. The solutions are allowed to cool to about 50° C. and then mixed together. The mixture is applied to a suitable fiber array by, for example, a brush technique and the tape thus formed is allowed to dry from room temperature to about 100° C. preferably under vacuum. The tape is cut to shape and stacked into a mold, forming a ply layup which is placed in a press preheated to about 150° C. to 200° C. The ply layup is heated for about 30 to 60 minutes at about 150° C. to 200° C., preferably for about 60 minutes at about 150° C. The ply layup is then heated at about 175° to 225° C., preferably about 200° C., for about 30 to 120 minutes, preferably about 60 minutes, at pressures of about 50 to 200 psi, preferably about 125 psi. The composite can then be cooled and removed from the press.

EXAMPLE 2

12g 6F dianhydride was dissolved in 20 mls Cellosolve by warming to yield a clear yellow solution. 5.6g 1,12 dodecane diamine was dissolved in 15 mls Cellosolve by warming. Both solutions were allowed to cool to 50° C. and were then mixed together yielding a clear yellow solution having 40% by weight of solids. This solution was applied to dry fiber Celion 6000 graphite tape (formed by drumwinding) by a brush technique and allowed to dry in air overnight. In drumwinding, the graphite fiber bundle is wound onto a drum, so that the fibers are aligned side-by-side to resemble a dry fiber tape. The tape was cut to 3 inch by 8 inch plies, dried at 120° C. for two hours, and stacked in a mold release agent coated mold to give a 12-ply thickness. The ply layup assembly was then placed in a press preheated to 120° C. The press temperature was then raised to 177° C. over a period of 20 minutes at which point pressure of 500 psi was applied for one hour. Then the temperature was cooled to 65° C. and the composite was removed from the press. This resulted in a fiber reinforced composite of poly((N,N'-dodecamethylene)-4(hexafluoroisopropylidene diphthalimide)) hereinafter referred to as 6F-1,12-DDA.

Poly 6F diimide polymer has a variety of uses including its use as a fiber. The polyimide may be utilized in its neat form, or in conjunction with other fillers, additives, polymers and compounds that impart the desired properties and economics to the product, as for example in polymer blends. For instance, it can be mixed with diatomaceous earth or mica, to form for instance a fuel pump housing. The polymer can even be used as a hot melt adhesive, although it is preferred to use the polyimide in its prepolymer form as a hot melt adhesive. The polyimide can be compression molded or transfer molded for use in, for instance, gear wheels in pumps or for encapsulating electronic components. The polyimide can also be machined into components, for example, intricately shaped articles, or articles requiring close tolerances. Composites formed from the polyimide also have a variety of uses including component parts in the aerospace industry. This includes composite skins, tail and main rotor spars, canopies and any other part where a tough composite is required, as in, for instance, helicopters.

Poly 6F diimide polymers and fiber reinforced composites exhibit a combination of desirable properties unavailable in other polymer systems. The following text, data, and explanations illustrate these properties and compare them to other typical commercial resin materials.

This polyimide prepolymer processes to the polymer and composite quickly, typically at temperatures and pressures of about 180° C. and about 25 psi. Other resins used in these applications typically require higher temperatures, pressures, and longer time periods. For instance, epoxy processes at about 210° C. and about 100 psi in about 2-3 hours. Other composites used in these applications typically require higher temperatures, pressures and longer processing times. For instance, a composite of AS Graphite TM (Hercules, Inc.)/P1700 TM (Union Carbide Corp.) processes at 316° C., 500 psi over one hour.

Tables I and II illustrate the moisture absorption properties of 6F-1,12-DDA polyimide and composites in comparison with other commercial materials. It is clear that this polyimide makes a significant advancement in the art as the other polymers absorb at least three times as much moisture. As was explained in the Background Art section the absorption of moisture is a significant problem as it results in swelling and the loss of mechanical properties.

TABLE I

Moisture Absorption Properties of 6F-1,12-DDA Polyimide Composites Compared with Commercial Products

| Composites | Wt % Moisture Absorbed[1] 95% Relative Humidity (RH) 82° C., to saturation |
|---|---|
| Celion 6000/6F-1,12 DDA composite | 0.16[4] |
| AS/3501-6 TM (Hercules Inc.) epoxy[2] | 1.20 (87% RH, 50° C.) |
| HMS TM (Hercules Inc.)/5208 TM (U.S. Polymeric Co.) Epoxy[3] | 0.80 (80% RH, 75° C.) |
| Celion 6000/PMR-15 TM (NASA) polyimide[5] | 1.30 |
| Celion 6000/MY720 TM (Ciba Geigy)-DDS TM (Aldrich) Epoxy[5] | 1.20 |
| AS/6350 TM (Hercules Inc.)[5] | 2.0 |
| HTS TM (Hercules Inc.)/PMR-15[5] | 1.4 |
| AS/934 TM (Fiberite Co.) Epoxy[5] | 4.0 |

[1]Moisture absorbed divided by initial dry polymer weight multiplied by one hundred.
[2]Values from Augl, J.M. Moisture Absorption and Diffusion in Hercules 3501-6 Epoxy Resin, Naval Service Weapons Center White Oak Laboratory Technical Report, (NSWC/WOL TR) 79-39, March 30, 1979.
[3]Values from Augl, J.M. NSWC/WOL TR 76-149, February 3, 1977.
[4]Actual test by inventor. An average of five specimens.
[5]Actual test by inventor.

TABLE II

Moisture Absorption Properties of 6F-1,12-DDA Polyimide Compared with Commercial Products

| Polymers | Wt %[1] Moisture Absorbed at Room Temperature Moisture Exposure Time | |
|---|---|---|
| | 24 hrs. | 48 hrs. |
| 6F-1,12-DDA | 0.19 | 0.27 |
| Epoxy | | |
| 3501-6[2] | 1.20 | |
| 5208[3] | 1.50 | |
| Polyimide PMR-15[4] | 0.60 | |

[1]Moisture absorbed divided by initial dry weight multiplied by one hundred.
[2]Values from Augl, J.M. Moisture Absorption and Diffusion in Hercules 3501-6 Epoxy Resin, NSWC/WOL TR 79-39, March 30, 1979.
[3]Values from Augl, J.M. and Bergen, A.W. The Effect of Moisture on Carbon Fiber Reinforced Epoxy Resin Composites, NSWC/WOL TR 76-7, September 23, 1975.
[4]Actual test by inventor. Inventor tested.

Typical polymers for the above-described applications may come in contact with other solvents besides water. If a polymer degrades upon exposure to a particular solvent, that polymer system is precluded from use in applications where the solvents are present. Table III shows the effect of a variety of solvents on 6F-1,12 DDA polyimide product and P1700 polysulfone, a typical commercial product used in the application described above. Clearly the polyimide is a superior polymer as it is less sensitive to many of the solvents tested.

TABLE III

Solvent Effects on 6F-1,12 DDA Polyimide and P1700

| Solvent | P1700 | 6F-1,12 DDA |
|---|---|---|
| Jet Propulsion Fuel JP-5 | swells | no change |
| n-hexane | no change | no change |
| isopropanol | no change | no change |
| mineral oil | swells | no change |
| Delco Supreme II TM brake fluid (General Motors Co.) | swells | no change |
| Transmission Fluid (Monarch Co.) | swells | no change |
| chloroform | dissolves | swells & disintegrates (still solid) |
| Toluene | dissolves | swells & disintegrates (still solid) |
| Methylethylketone | dissolves | swells |
| N—methylpyrroldinone | dissolves | swells & disintegrates |
| o-dichlorobenzene | dissolves | swells & disintegrates (still solid) |

6F-1,12-DDA polyimide and composites containing this polymer exhibit easy low temperature processing and resist a number of solvents including water. This is achieved while maintaining other desirable mechanical properties. Overall in this regard, they have equivalent or better mechanical properties when compared to other typical commercial polymers. For example, Table IV illustrates $K_{IC}$ (millipascals per the square root of meters; $MPa/m^{\frac{1}{2}}$) a measure of fracture toughness for 6F-1,12 DDA polyimide in comparison to other commercially available polymers. The polyimide shows good values comparable to so-called high toughness Polyetherketone TM (ICI Chemicals) and Polyethersulfone TM (ICI Chemicals). It is significantly tougher than PMR-15 or MY720.

TABLE IV

Fracture Toughness, $K_{IC}$, of 6F-1,12 DDA Polyimide Compared with Commercial Products

| | $K_{IC}$ $(MPa/m^{\frac{1}{2}})$ |
|---|---|
| Polyetherketone | 4.2 |
| 6F-1,12 DDA Polyimide (1.10)[1] | 3.2 |
| 6F-1,12 DDA Polyimide (1.20)[1] | 2.4 |
| 6F-1,12 DDA Polyimide (1.05)[1] | 2.1 |
| Polyethersulfone | 2.2 |
| Epoxy (MY720) | .4 |
| PMR-15 | .4 |

[1]Three different polyimide resin samples synthesized utilizing different monomer proportions (diamine moles/dianhydride moles) used in the synthesis.

Table V illustrates the effect of moisture on composite mechanical properties such as shear and flexural strengths. Clearly, no effects are noted at room temperature in shear, minimal effects at 100° C. inshear strength and no effect at either room temperature or 100° C. in flexure strength. The low flexure strength value (thousands of pounds per square inch, ksi) is due to low fiber content (40 volume %) and not to poor load transfer from fiber to fiber, through the polymer (matrix). By comparison T-300 TM (Union Carbide Corp.)/CE-324 TM (Ferro Corp.), a typical 100° C. graphite epoxy composite lost considerable strengths, about 25% upon exposure to moisture.

TABLE V

Effect of Moisture on
Celion 6000/6F-1,12 DDA Composites
Shear Strength, (Psi) - Flexural Strength, (Ksi)

|  | Room Temp. | | 100° C. | |
| --- | --- | --- | --- | --- |
|  | Dry | Wet | Dry | Wet |
|  | Shear Strength, Psi | | | |
| Celion 6000/6F-1,12 DDA[1] | 10,420 | 10,600 | 8,590 | 8,400 |
| T-300/CE-324[2] | 12,800 | 9,300 | 8,000 | 6,000 |
| AS/P1700[2] | 10,450 | 9,130 | | |
|  | Flexural Strength, Ksi | | | |
| Celion 6000/6F-1,12 DDA[1] (40 Vol %) | 148 | 178 | 145 | 147 |
| T-300/CE-324 (60 Vol %)[2] | 247 | 190 | 202 | 150 |

[1]Actual test by inventor.
[2]Value from Ferro Corp. Commercial Data Sheet.

Table VI illustrates the 10° off axis tensile strength compared with PMR-15 composites for a typical 6F-1,12-DDA polyimide composite. The high strain-to-failure relative to the PMR-15 composite is a measure of the "toughness" of the polyimide composite.

TABLE VI

10° Off Axis Tensile Properties

|  | Strength ksi | Modulus 10⁶ psi | % Elongation |
| --- | --- | --- | --- |
| Celion 6000/6F-1,12 DDA | 65.5 | 10.0 | 2.5 |
| Celion 6000/PMR-15 | 63.0 | 10.0 | 1.1 |

This discovery advances the field of materials technology by providing a polyimide and composite with a unique combination of desired properties. It's substantial solvent resistance makes it suitable for a wide variety of applications where solvents including moisture in the liquid or gaseous form are present. In addition these polyimides process at reduced temperatures and pressure and in shorter time periods than most other commercial polymers. However, these characteristics are attained while still maintaining the desired mechanical properties. Thus its toughness is better than other polymers that are typically used for the same applications. It is believed that by the incorporation of a hexafluoroisopropylidene moiety into the polymer backbone, a polyimide and composite has been developed that exhibits the desired characteristics required by many applications.

It should be understood that the invention is not limited to the particular embodiments shown and described herein, but that various changes and modifications may be made without departing from the spirit and scope of this novel concept as defined by the following claims.

I claim:

1. A polyimide having repeating polymer units of the formula

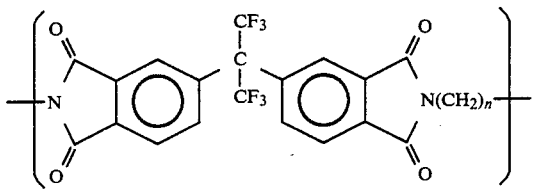

wherein n is 2 to about 20 and the molecular weight of the polymer chain is such that the polymer absorbs below about 0.2% by weight moisture at room temperature.

2. The polyimide as recited in claim 1 wherein n is about 10 to about 14.

3. The polyimide as recited in claim 1 wherein n is 12.

4. A method of making a polyimide comprising reacting an anhydride with a diamine to form a polyamic acid, imidizing the polyamic acid to form a polyimide and further polymerizing said polyimide prepolymer by exposing the polyimide prepolymer to heat wherein the anhydride is 4,4'-(hexafluoroisopropylidene)bis (o-phthalic anhydride) and the diamine is a compound having the formula $H_2N(CH_2)_nNH_2$ where n is 2 to about 20 resulting in said polyimide which absorbs less than 0.20% by weight moisture at room temperature.

5. The method as recited in claim 4 wherein the anhydride solution is mixed with the diamine solution by adding the anhydride solution to the diamine solution over about 25 to 30 minutes.

* * * * *